US010769750B1

(12) United States Patent
Yoon

(10) Patent No.: US 10,769,750 B1
(45) Date of Patent: Sep. 8, 2020

(54) RAY TRACING DEVICE USING MIMD BASED T AND I SCHEDULING

(71) Applicant: SILICONARTS, INC., Seoul (KR)

(72) Inventor: Hyung Min Yoon, Seoul (KR)

(73) Assignee: SILICONARTS, INC., Seoul (KR)

( * ) Notice: Subject to any disclaimer, the term of this patent is extended or adjusted under 35 U.S.C. 154(b) by 0 days.

(21) Appl. No.: 16/427,926

(22) Filed: May 31, 2019

(30) Foreign Application Priority Data

Apr. 11, 2019 (KR) .................. 10-2019-0042403

(51) Int. Cl.
*G06T 15/06* (2011.01)
*G06T 1/20* (2006.01)
*G06T 15/80* (2011.01)
*G06T 15/60* (2006.01)
*G06T 15/00* (2011.01)

(52) U.S. Cl.
CPC .............. *G06T 1/20* (2013.01); *G06T 15/005* (2013.01); *G06T 15/06* (2013.01); *G06T 15/60* (2013.01); *G06T 15/80* (2013.01); *G06T 2200/04* (2013.01); *G06T 2200/28* (2013.01); *G06T 2210/52* (2013.01)

(58) Field of Classification Search
None
See application file for complete search history.

(56) References Cited

U.S. PATENT DOCUMENTS

| 8,736,610 | B2 * | 5/2014 | McCombe | .............. | G06T 15/06 345/426 |
| 2011/0285710 | A1 * | 11/2011 | Mejdrich | ................ | G06T 15/06 345/426 |
| 2012/0069023 | A1 * | 3/2012 | Hur | .......................... | G06T 15/06 345/426 |
| 2014/0049539 | A1 * | 2/2014 | Lee | ........................ | G06T 15/005 345/419 |
| 2015/0103082 | A1 * | 4/2015 | Lee | .......................... | G06T 1/20 345/506 |
| 2016/0071309 | A1 * | 3/2016 | Shin | ........................ | G06T 15/06 345/426 |
| 2016/0071312 | A1 * | 3/2016 | Laine | ........................ | G06T 9/40 345/419 |
| 2020/0051316 | A1 * | 2/2020 | Laine | ........................ | G06T 1/20 |

FOREIGN PATENT DOCUMENTS

KR 10-0300969 B1 10/2001

* cited by examiner

*Primary Examiner* — Joni Hsu
(74) *Attorney, Agent, or Firm* — Paratus Law Group, PLLC

(57) ABSTRACT

Disclosed is a ray tracing device using MIMD based T&I scheduling, including: a ray receiving unit receiving a ray generated with respect to a specific frame according to a frame progress order and storing the received ray in a ray buffer; a ray scheduling unit allocating a ray provided by the ray buffer to one of a plurality of T&I pipelines, each of which including an input and output buffers; a traversal/intersection test performing unit performing a traversal/intersection test on an allocated ray in a parallel fashion by using each of the plurality of T&I pipelines and determining a triangle intersecting the allocated ray; and a test result ordering unit receiving information about the triangle from the plurality of T&I pipelines as a test result, storing the received test result in a test buffer, and re-arranging the received test result according to a frame progress order.

8 Claims, 7 Drawing Sheets

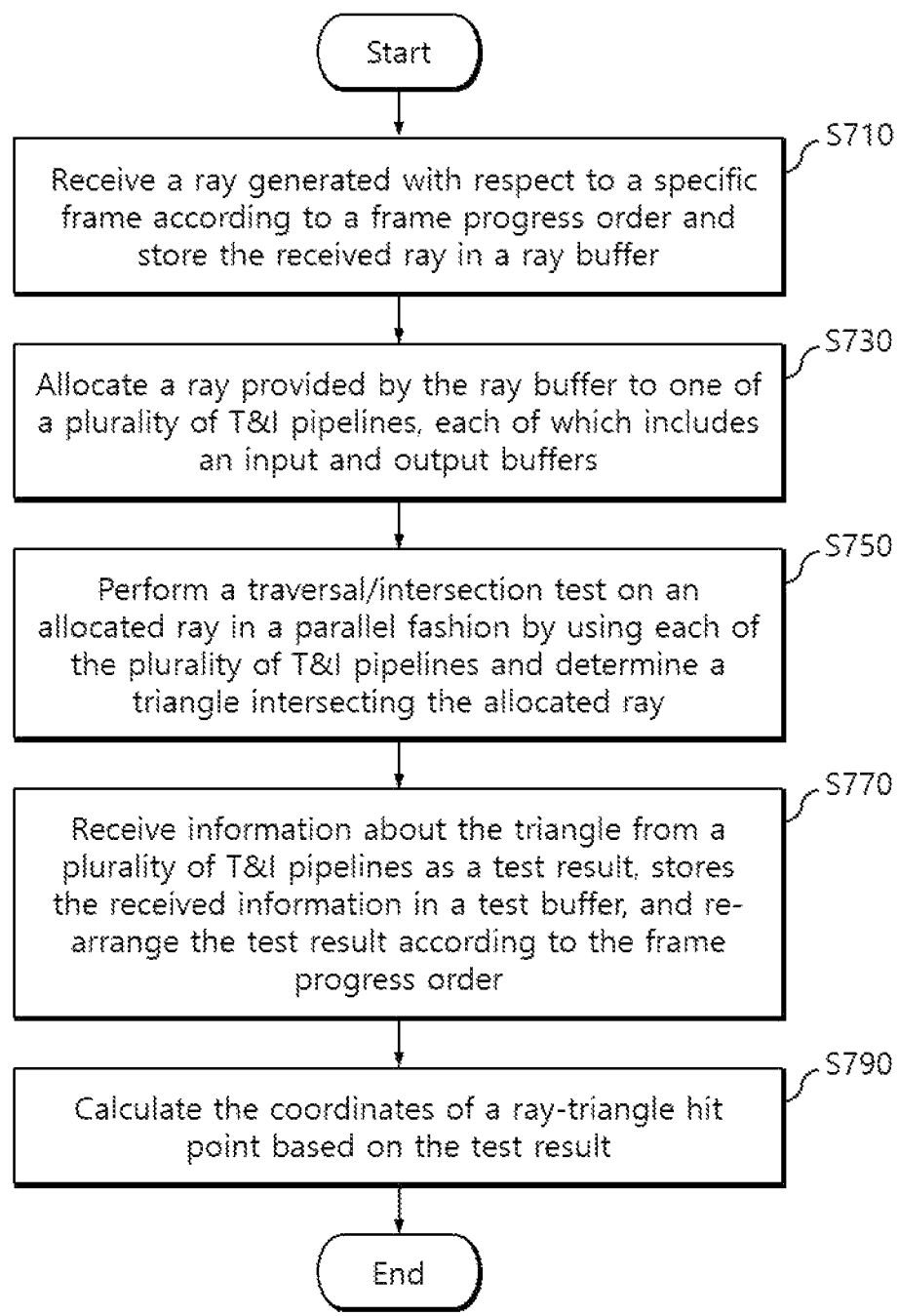

RAY TRACING DEVICE USING MIMD BASED T AND I SCHEDULING

CROSS-REFERENCE TO PRIOR APPLICATION

This application claims priority to Korean Patent Application No. 10-2019-0042403, filed on Apr. 11, 2019, which is hereby incorporated by reference in its entirety.

BACKGROUND

The present invention relates to a ray tracing technique using MIMD based T&I scheduling and, more particularly, to a ray tracing device using MIMD based T&I scheduling capable of performing ray tracing effectively by using an MIMD parallel structure.

3D graphics technology is a technology used for three-dimensional representation of geometry data stored in a computing device and is widely used today for various industries including media and game industries. Ray tracing technique is capable of simulating various optical effects such as reflection, refraction, and shadow and capable of producing photorealistic 3D graphic images.

In particular, ray tracing technique requires a large amount of computations and high memory bandwidth for traversal of an acceleration structure and an intersection test between ray primitives.

The Korea registered patent No. 10-0300969 (Jun. 21, 2001) relates to a method for extracting an intersection test area in ray tracing and a rendering apparatus for the method. The registered patent discloses a technique including a process for extracting an area which requires an intersection test for a primary ray projected from a viewpoint by projecting a bounding box of a target object on the image plane and a process for extracting an area of the target object from which a secondary ray may be reflected depending on the shape of the target object to intersect a bounding box of a different object and extracting an area requiring an intersection test for the secondary ray.

PRIOR ART REFERENCES

Patent References
Korea registered patent No. 10-0300969 (Jun. 21, 2001)

SUMMARY

One embodiment of the present invention provides a ray tracing device using MIMD based T&I scheduling capable of performing ray tracing effectively by using an MIMD parallel structure.

One embodiment of the present invention provides a ray tracing device using MIMD based T&I scheduling capable of providing efficient T&I scheduling by arranging buffers operating according to the order of priority before and after a plurality of T&I pipelines.

One embodiment of the present invention provides a ray tracing apparatus using MIMD based T&I scheduling capable of re-arranging results tested by a plurality of T&I pipelines and merging similar test results into one.

Among embodiments of the present invention, a ray tracing device using MIMD based T&I scheduling comprises a ray receiving unit receiving a ray generated with respect to a specific frame according to a frame progress order and storing the received ray in a ray buffer; a ray scheduling unit allocating a ray provided by the ray buffer to one of a plurality of T&I pipelines, each of which including an input and output buffers; a traversal/intersection test performing unit performing a traversal/intersection test on an allocated ray in a parallel fashion by using each of the plurality of T&I pipelines and determining a triangle intersecting the allocated ray; and a test result ordering unit receiving information about the triangle from the plurality of T&I pipelines as a test result, storing the received test result in a test buffer, and re-arranging the received test result according to a frame progress order.

Between the ray buffer and the test buffer, whichever one has a higher value of the priority will be output first irrespective of the order of an input sequence while, if the priorities are the same, the buffers may be output according to the order of the input sequence.

Each of the plurality of T&I pipelines may perform a traversal process for an acceleration structure, a triangle list fetch process, and a ray-triangle intersection test process sequentially based on the ray provided by the input buffer and store results of performing the processes in the output buffer.

The ray receiving unit may assign a frame identifier for identifying the specific frame and priority to the generated ray.

The ray receiving unit may generate the frame identifier based on the number of rays generated with respect to the specific frame.

The ray scheduling unit may include a ray counter counting the number of successes of the allocation; when all of the input buffers of the plurality of T&I pipelines are full, assign the highest priority to the corresponding ray and store the ray in the ray buffer, where the count of the ray counter may be maintained as before.

The ray scheduling unit may allocate rays generated from the same pixel so as to be processed in the same T&I pipeline.

Among test results arranged consecutively after the re-arrangement, the test result ordering unit may merge those test results having the same frame identifiers and triangles into one.

The ray tracing device may further include a hit point calculation unit calculating coordinates of a ray-triangle hit point based on the test result.

BRIEF DESCRIPTION OF THE DRAWINGS

FIG. 7 is a flow diagram illustrating a T&I scheduling process performed in a ray tracing device using MIMD based T&I scheduling according to one embodiment of the present invention.

DETAILED DESCRIPTION

Figure 1:
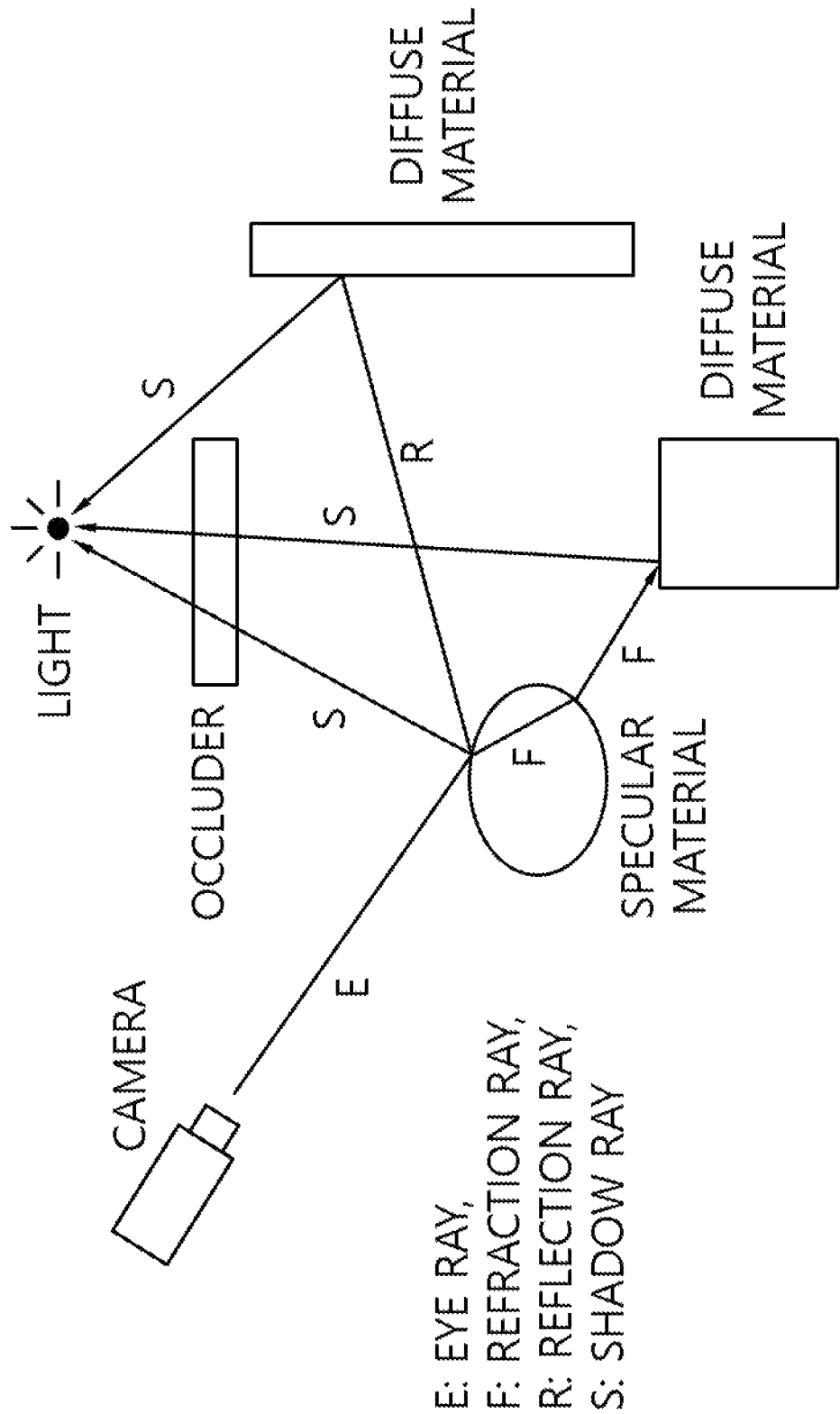
FIGS. 1 and 2 illustrate a ray tracing process performed by a ray tracing device according to one embodiment of the present invention.

Since description of the present invention is merely an embodiment for illustrating structural or functional description, it should not be interpreted that the technical scope of the present invention is limited by the embodiments described in this document. In other words, embodiments may be modified in various ways and implemented in various other forms; therefore, it should be understood that various equivalents realizing technical principles of the present invention belong to the technical scope of the present invention includes. Also, since it is not meant that a specific embodiment should support all of the purposes or effects intended by the present invention or include only the purposes or effects, the technical scope of the disclosed invention should be not regarded as being limited to the descriptions of the embodiment.

Meanwhile, implication of the terms used in this document should be understood as follows.

The terms such as "first" and "second" are introduced to distinguish one element from the others, and thus the technical scope of the present invention should not be limited by those terms. For example, a first element may be called a second element, and similarly, the second element may be called the first element.

If a constituting element is said to be "connected" to other constituting element, the former may be connected to the other element directly, but it should be understood that another constituting element may be present between the two elements. On the other hand, if a constituting element is said to be "directly connected" to other constituting element, it should be understood that there is no other constituting element present between the two elements. Meanwhile, other expressions describing a relationship between constituting elements, namely "between" and "right between" or "adjacent to" and "directly adjacent to" should be interpreted to provide the same implication.

A singular expression should be understood to indicate a plural expression unless otherwise explicitly stated. The term of "include" or "have" is used to indicate existence of an embodied feature, number, step, operation, constituting element, component, or a combination thereof; and should not be understood to preclude the existence or possibility of adding one or more other features, numbers, steps, operations, constituting elements, components, or a combination thereof.

Identification symbols (for example, a, b, and c) for individual steps are used for the convenience of description. The identification symbols are not intended to describe the operation order of the steps. Therefore, unless otherwise explicitly indicated in the context of description, the steps may be executed differently from the stated order. In other words, the respective steps may be performed in the same order as stated in the description, actually performed simultaneously, or performed in a reverse order.

The present invention may be implemented in the form of program codes in a computer-readable recording medium, where a computer-readable recording medium includes all kinds of recording apparatus which store data that may be read by a computer system. Examples of a computer-readable recording medium include ROM, RAN, CD-ROM, magnetic tape, floppy disk, and optical data storage device. Also, a computer-readable recording medium may be distributed may be distributed over computer systems connected to each other through a network so that computer-readable codes may be stored and executed in a distributed manner.

Unless defined otherwise, all of the terms used in this document provide the same meaning as understood generally by those skilled in the art to which the present invention belongs. Those terms defined in ordinary dictionaries should be interpreted to have the same meaning as conveyed by a related technology in the context. And unless otherwise defined explicitly in the present invention, those terms should not be interpreted to have ideal or excessively formal meaning.

Figure 2:
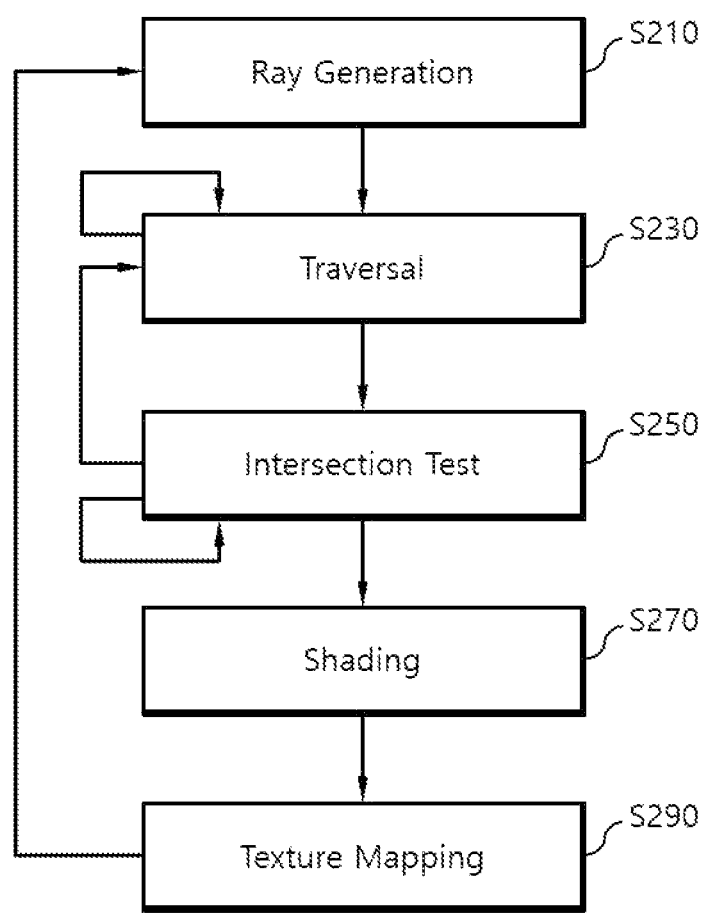

FIGS. 1 and 2 illustrate a ray tracing process performed by a ray tracing device according to one embodiment of the present invention.

Referring to FIG. 1, an eye ray (E) is generated at the camera position for each pixel, and calculations are carried out to find an object hit by the ray (E). If the object hit by the corresponding ray (E) is a specular material which refracts the ray or a diffuse material which reflects the ray, a refraction ray (F) simulating the refraction effect and/or a reflection ray (R) simulating the reflection effect is generated at the point the corresponding ray (E) meets the object, and a shadow ray (S) may be generated in the direction of light. In one embodiment, if a shadow ray (S) hits another object (occluder), a shadow may be generated at the point where the corresponding shadow ray (S) has been generated.

Referring to FIG. 2, the ray tracing process may be performed recursively and may include (i) eye ray generation step S210, (ii) acceleration structure (AS) traversal step S230, (iii) intersection test step S250, (iv) shading step S270, and (v) texture mapping step S290.

The eye ray generation step S210 may generate at least one ray based on eye ray generation information and shading information. Eye ray generation information may include screen coordinates for generating an eye ray, and shading information may include a ray index for obtaining screen coordinates, coordinates of a ray-triangle hit point, color value, and shading ray type. Also, shading information may further include additional information according to the shading ray type.

Here, a shading ray may include a shadow ray (S), secondary ray or NULL ray; and the secondary ray may include a refraction ray (F) and/or reflection ray (R). The refraction ray (F) may include the refractive index of a ray-triangle hit point as additional information, and the reflection ray (R) may include reflectance of the ray-triangle hit point as additional information.

The acceleration structure traversal step S230 may find a leaf node which intersects a ray by searching nodes based on the acceleration structure. Here, the acceleration structure may correspond to a k-d tree, and the traversal process of the acceleration structure may correspond to recursion of the k-d tree.

The intersection test step S250 may correspond to a ray-triangle intersection test, which may read a triangle list belonging to a leaf node intersecting a ray and perform an intersection test for a given ray based on the coordinates of the corresponding triangle list. The shading step S270 may calculate the color value of the ray-triangle hit point and deliver shading information including the coordinates, color value, and shading ray type of the ray-triangle hit point to the next step. The texture mapping step S290 may generate an image for a current frame through texture mapping.

Since an image of a current frame may include both of a static and dynamic objects in the ray tracing process, the ray-triangle intersection test may be performed for each of the static and dynamic acceleration structures, and ray tracing may be performed based on the acceleration structure where ray meets triangles in the static or dynamic acceleration structure. During the ray tracing process, if the ray intersects a triangle in both of the static and dynamic acceleration structures, an acceleration structure for ray tracing may be determined based on the viewpoint of the ray and distances of the respective triangles hit by the ray.

In other words, since a triangle at a short distance may correspond to an object located close to the viewer, a triangle yielding a short distance among the respective distances of the triangles which intersect the viewpoint of the ray may be selected. For example, suppose the distance between the eye viewpoint and an intersecting triangle of the static acceleration structure is S1, and the distance between the eye viewpoint and an intersecting triangle of the dynamic acceleration structure is S2. If S1 is shorter than S2, ray tracing may be performed based on the triangle intersecting the static acceleration structure while, if S2 is shorter than S1, ray tracing may be performed based on the triangle intersecting the dynamic acceleration structure.

Figure 3:
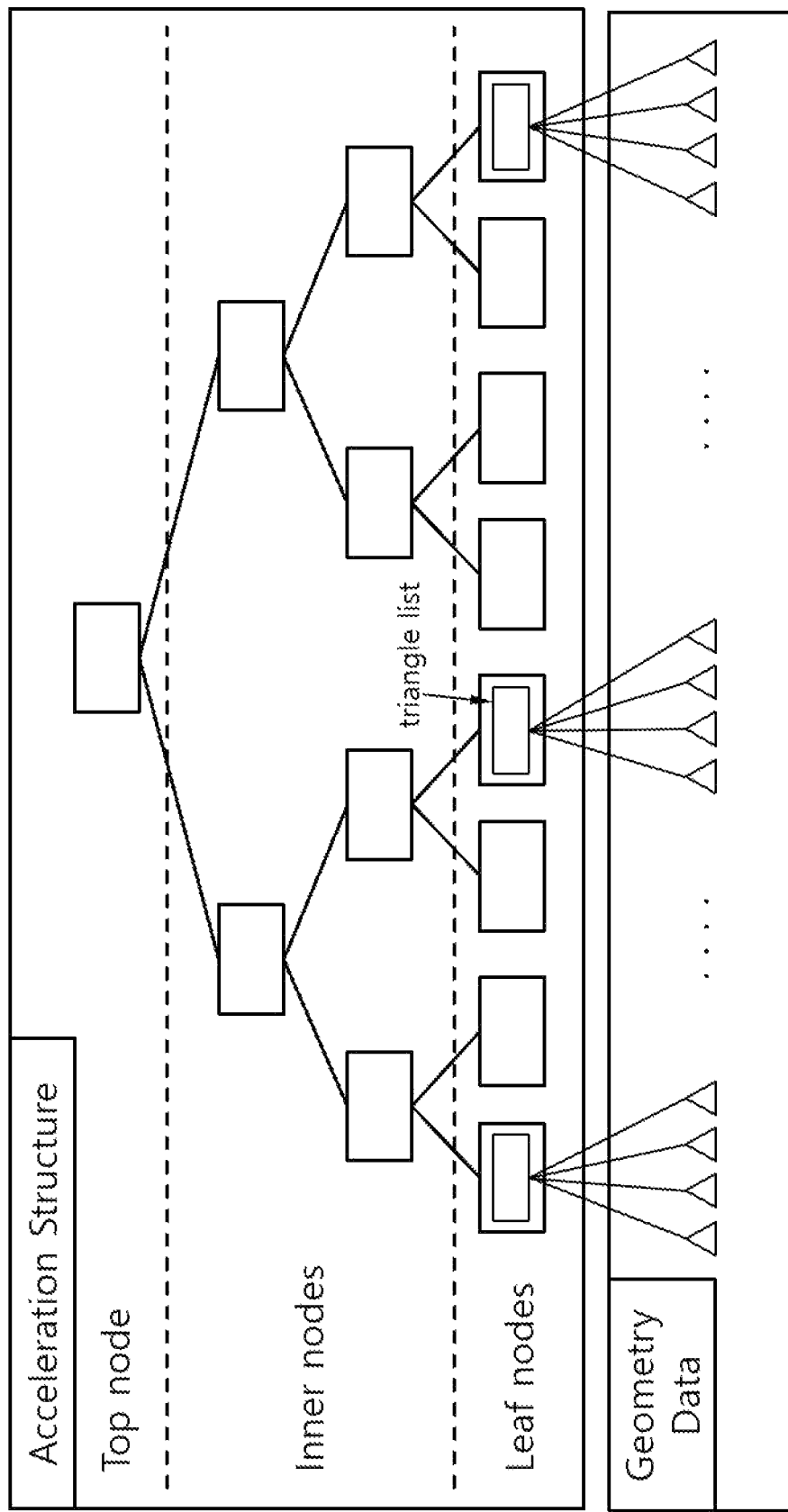
FIG. 3 illustrates an acceleration structure and geometry data used in a ray tracing process.

FIG. 3 illustrates an acceleration structure and geometry data used in a ray tracing process.

Referring to FIG. 3, the acceleration structure (AS) may include a k-d tree (k-depth tree) or bounding volume hierarchy (BVH) commonly used for ray tracing. FIG. 3 illustrates an acceleration structure based on a k-d tree.

A k-d tree is one of spatial partitioning tree structures, which may be used for the ray-triangle intersection test. A k-d tree may include a top node, inner nodes, and leaf nodes, where a leaf node may include a triangle list for pointing at least one triangle included in the geometry data. In one embodiment, if triangle information included in the geometry data is implemented in the form of an array, the triangle list included in the leaf node may correspond to an array index.

Figure 4:
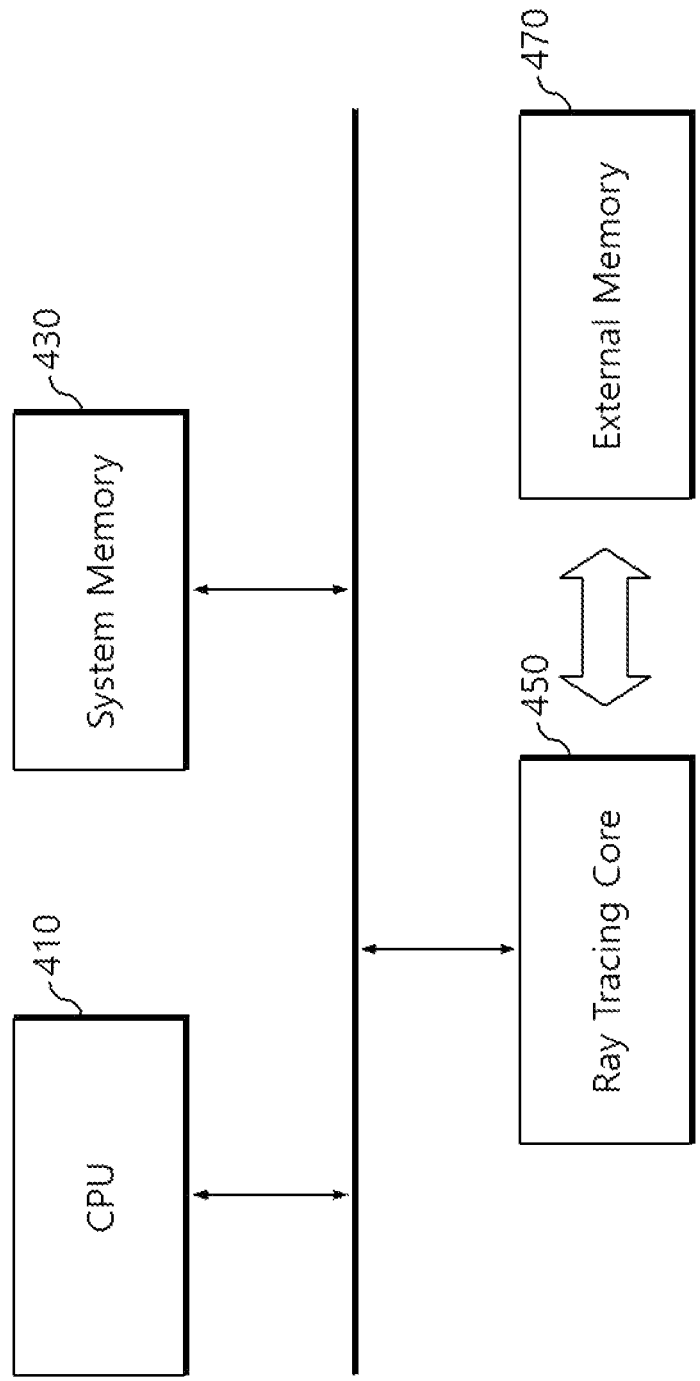
FIG. 4 illustrates a ray tracing device according to one embodiment of the present invention.

FIG. 4 illustrates a ray tracing device according to one embodiment of the present invention.

Referring to FIG. 4, a ray tracing device 400 may include a central processing unit 410, system memory 430, ray tracing core 450, and external memory 470.

The Central Processing Unit (CPU) 410 may control the overall operation of the ray tracing device 400, control operation of the ray tracing core 450, and control access to the system memory 420 and external memory 470.

In one embodiment, the CPU 410 may perform graphics processing of a 3D scene in conjunction with the ray tracing core 450. For example, the CPU 410 may construct an acceleration structure for static objects. Also, the CPU 410 may update a dynamic object by performing Level Of Detail (LOD) operations on the dynamic object.

Here, the LOD operation may include reduction of complexity of representing 3D objects when an object moves away from a viewer or according to different criteria such as object importance, eye-space speed or position. In another embodiment, the CPU 410 may construct an acceleration structure for dynamic objects in conjunction with the ray tracing core 450.

The system memory 430 may be accessed by the CPU 410 or ray tracing core 450; and may store geometry data and texture data of static and dynamic objects comprising a 3D scene. In one embodiment, the system memory 430 may include a frame buffer. At this time, the frame buffer may correspond to the area on the system memory 430 which stores a result of graphics processing of a 3D scene.

The ray tracing core 450 may correspond to a graphic processor performing graphics processing of a 3D scene. In one embodiment, the ray tracing core 450 may be implemented by being included in the same chip with the graphic processor or may be implemented as a single chip. The ray tracing core 450 may perform ray tracing based on an acceleration structure, generate an image of a frame as a result of the ray tracing, and store the generated image into the frame buffer on the system memory 430.

In one embodiment, the ray tracing core 450 may perform ray tracing by performing a ray generation step, traversal & intersection test step, shading step, and texture mapping step. In particular, the traversal & intersection test step may perform a traversal & intersection test by using a plurality of T&I pipelines which adopt parallel Multiple Instruction Multiple Data (MIMD) architecture. In other words, the ray tracing core 450 may process each ray independently by adopting MIMD parallel architecture and utilize the pipelines more efficiently compared with the Single Instruction Multiple Data (SIMD) architecture.

The external memory 470 may be accessed by the ray tracing core 450 and may store static objects, dynamic objects, texture data, and acceleration structures about static and dynamic objects separately. Meanwhile, the system memory 430 and the external memory 470 are separated only from a logical viewpoint, which is not necessarily limited to this distinction, and may be implemented being integrated into one memory depending on their operating environment.

Figure 5:
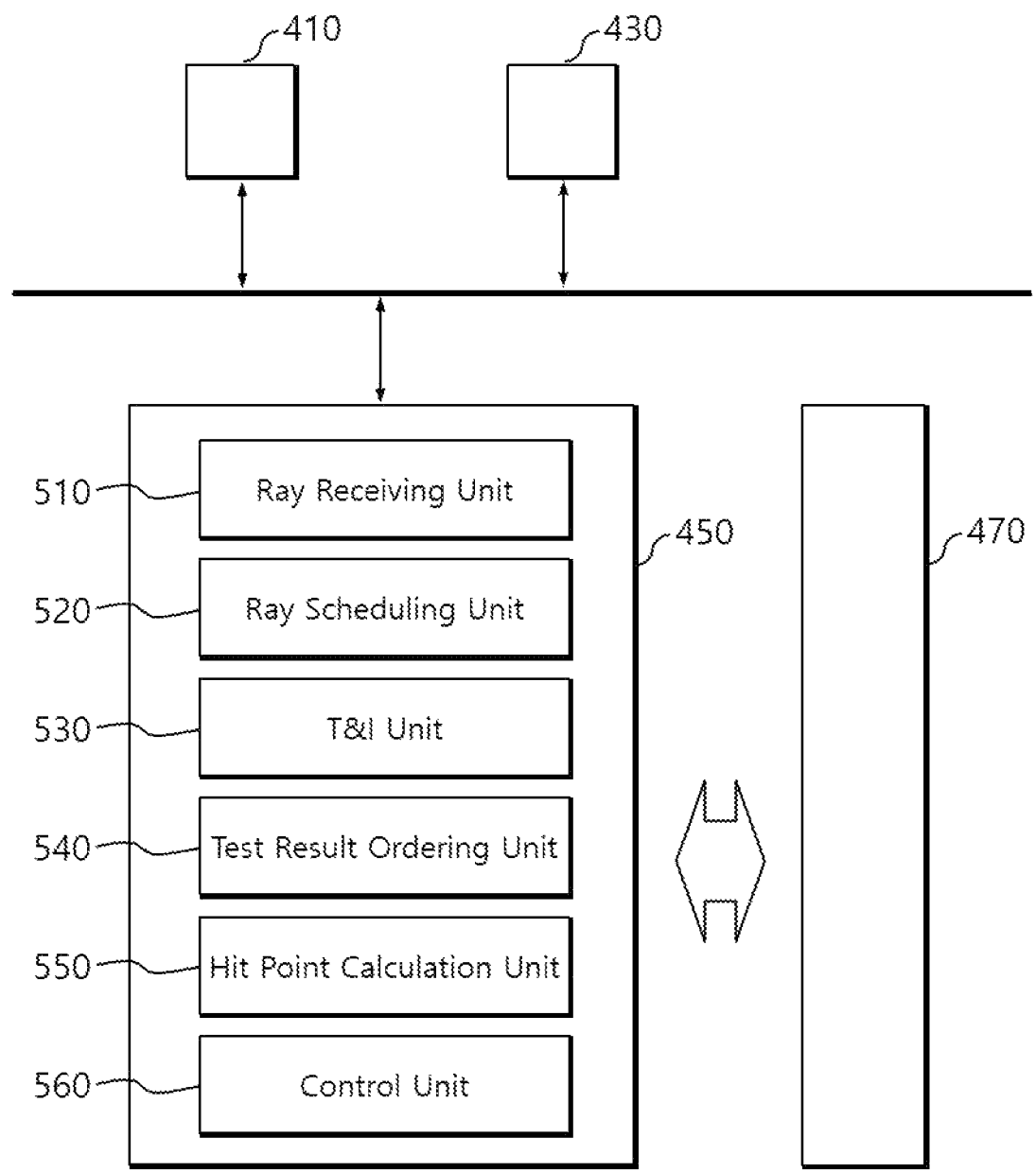
FIG. 5 illustrates the ray tracing core of FIG. 4.

FIG. 5 illustrates the ray tracing core of FIG. 4.

Referring to FIG. 5, the ray tracing core 450 may include a ray receiving unit 510, ray scheduling unit 520, traversal & intersection test performing unit 530, test result ordering unit 540, hit point calculation unit 550, and controller 560.

The ray receiving unit 510 may receive a ray generated with respect to a specific frame according to a frame progress order and store the received ray in a ray buffer. Here, the ray buffer may perform the role of temporarily storing a ray generated at the previous step before the ray is allocated to one of a plurality of T&I pipelines. Therefore, the generated ray may be stored primarily in the ray buffer and may be used for operation of ray tracing by being allocated to an appropriate T&I pipeline at an appropriate timing.

In one embodiment, the ray receiving unit 510 may assign a frame identifier for identifying a specific frame and priority to a generated ray. The ray receiving unit 510 may assign a frame identifier for identifying that a generated ray is used for generating an image related to a specific frame, where the frame identifier may be defined to include various pieces of information about the corresponding frame as information for identifying the specific frame. Also, the ray receiving unit 510 may assign priority to a ray for efficient management of the ray buffer, where the priority may be assigned based on the type of a ray and the position at which the ray is generated or used during the ray tracing process.

In one embodiment, as the priority becomes higher, the ray buffer may be output first irrespective of the order of an input sequence while, if the priorities are the same, the ray buffer may be output according to the order of the input sequence. In other words, the ray buffer may be implemented as a priority queue. Meanwhile, the ray buffer may be implemented by being included in the ray receiving unit 510 or may be implemented independently from the ray receiving unit 510.

In one embodiment, the ray receiving unit 510 may generate a frame identifier based on the number of rays generated with respect to a specific frame. In other words, a frame identifier may include information about the number of rays generated with respect to a specific frame and may be delivered together with a ray, after which the corresponding information may be utilized during a T&I scheduling process. In another embodiment, the ray receiving unit 510 may generate a frame identifier based on the pixel position in a specific frame. Therefore, a frame identifier may be defined by including information about a specific frame and pixel position.

The ray scheduling unit 520 may allocate a ray provided by the ray buffer to one of a plurality of T&I pipelines, each of which includes an input and output buffers. The ray tracing core 450 may be implemented by including a plurality of T&I pipelines and effectively perform a traversal & intersection test against generated rays in a parallel fashion by properly distributing the rays across the plurality of T&I pipelines.

At this time, the plurality of T&I pipelines may adopt an integrated pipeline architecture which is designed to efficiently support an acceleration structure without causing load imbalance between the traversal and intersection test. Also, each of the plurality of T&I pipelines may be implemented by including an input and output buffers to enhance performance and support the MIMD architecture.

In one embodiment, the ray scheduling unit 520 may include a ray counter counting the number of successes of the allocation; when all of the input buffers of the plurality of T&I pipelines are full, assign the highest priority to the corresponding ray and store the ray in the ray buffer, where the count of the ray counter may be maintained as before. The ray scheduling unit 520 may allocate a ray to one of the plurality of T&I pipelines according to the order that the rays are provided by the ray buffer; however, if input buffers of all of the T&I pipelines are full with rays, the rays may be entered again to the ray buffer and made to wait there until there is room in the input buffer. Also, the highest priority may be assigned to the ray in the ray buffer so that the ray is output first from the ray buffer, and the count of the ray counter may be maintained as before.

In one embodiment, the ray scheduling unit 520 may allocate rays generated from the same pixel so as to be processed in the same T&I pipeline. To this purpose, each ray may include information about a pixel. For example, a frame identifier assigned to each ray by the ray receiving unit 510 may include information about the position of a pixel. The ray scheduling unit 520 may check position information of the pixel from the frame identifier, through which an allocation operation may be performed so that the rays generated from the same pixel are processed in the same T&I pipeline.

The traversal/intersection test performing unit 530 may perform a traversal/intersection test on an allocated ray in a parallel fashion by using each of the plurality of T&I pipelines and determine a triangle intersecting the allocated ray. In other words, each of the plurality of T&I pipelines may perform the acceleration structure traversal process and ray-triangle intersection test process. Each T&I pipeline may perform the traversal/intersection test independently from other T&I pipelines and may be implemented by including both of an input and output buffers to realize the MIMD parallel architecture.

In one embodiment, each of a plurality of T&I pipelines may perform a traversal process for an acceleration structure, a triangle list fetch process, and a ray-triangle intersection test process sequentially based on the ray provided by the input buffer and store results of performing the processes in the output buffer. In the traversal process, the T&I pipeline may find a leaf node intersecting the ray by searching the nodes in the acceleration structure. Since the traversal algorithm for acceleration structure is well-known to those skilled in the art, descriptions thereof will be omitted.

Also, in the triangle list fetch process, the T&I pipeline may read a triangle list included in an intersecting leaf node. In the ray-triangle intersection test process, the T&I pipeline may read coordinates of the triangle list and perform an intersection test against a given ray.

The test result ordering unit 540 may receive information about the triangle from a plurality of T&I pipelines as a test result, stores the received information in a test buffer, and re-arrange the test result according to a frame progress order. Here, the test buffer may perform the role of temporarily storing the result of the traversal/intersection test performed by the plurality of T&I pipelines. Therefore, the test result may be stored primarily in the test buffer and delivered to the hit point calculation unit 550 at an appropriate timing to be used for ray tracing operation.

Also, the test result ordering unit 540 may re-arrange the test results stored in the test buffer according to a frame progress order. The test results may be entered into the test buffer differently from the order of parallel processing results by the plurality of T&I pipelines, which is assigned by the ray scheduling unit 520 and may be re-arranged based on the frame progress order.

In one embodiment, as the priority becomes higher, the test buffer may be output first irrespective of the order of an input sequence while, if the priorities are the same, the test buffer may be output according to the order of the input sequence. In other words, the test buffer may be implemented as a priority queue. The test buffer may be implemented by being included in the test result ordering unit 540 or may be implemented independently from the test result ordering unit 540.

In one embodiment, among test results arranged consecutively after the re-arrangement, the test result ordering unit 540 may merge those test results having the same frame identifiers and triangles into one. In other words, if information about a triangle corresponding to the test result is the same, the corresponding information may be integrated into one, and test results may be merged together by sequentially concatenating only the ray information related to each test result.

Therefore, the hit point calculation unit 550 which has received the merged test result may be implemented so that it determines whether to integrate the test results before the hit point calculation step and performs hit point calculations according to whether the integration is determined.

The hit point calculation unit 550 may calculate the coordinates of a ray-triangle hit point based on the test result. More specifically, the hit point calculation unit 550 may calculate the coordinates of the ray-triangle hit point by using a distance to the triangle output from the test result ordering unit 540 and hit by a ray and the vector value of the given ray. Since only one ray-triangle hit point occurs for each ray, the hit point calculation unit 550 may be implemented by using only one pipeline. In one embodiment, considering cost efficiency, the hit point calculation unit 550 may be implemented by being included in the traversal/intersection test performing unit 530.

In one embodiment, the hit point calculation unit 550 may include an output counter which counts the number of rays delivered to the shading step S270.

In one embodiment, the ray tracing core 450 may control the operation of T&I scheduling by using the ray counter and the output counter.

The controller 560 may control the overall operation of the ray tracing core 450; and manage the control flow or data flow among the ray receiving unit 510, ray scheduling unit 520, traversal/intersection test performing unit 530, test result ordering unit 540, and hit point calculation unit 550.

Figure 6:
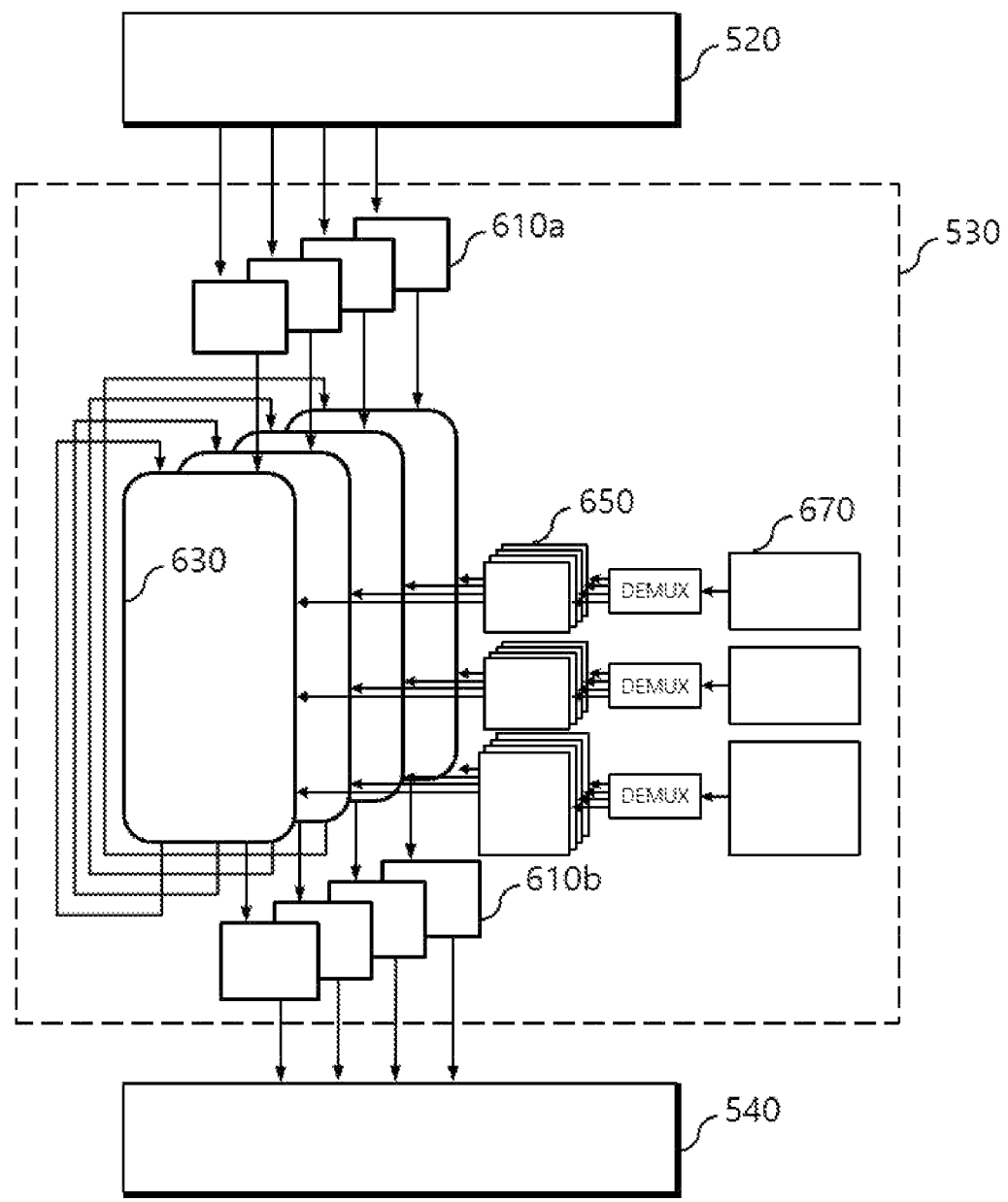
FIG. 6 illustrates the traversal/intersection test performing unit of FIG. 5.

FIG. 6 illustrates the traversal/intersection test performing unit of FIG. 5.

Referring to FIG. 6, the traversal/intersection test performing unit 530 may include a plurality of T&I pipeline units 630, and each of the plurality of T&I pipelines 630 may include an input buffer 610a, output buffer 610b, L1 cache 650, and L2 cache 670.

When a ray generated by the ray scheduling unit 520 is allocated to one of the plurality of T&I pipeline unit 630, the traversal/intersection test performing unit 530 may perform the traversal/intersection test through the corresponding T&I pipeline unit 630. In particular, the traversal/intersection test performing unit 530 may process each ray independently by adopting the MIMD parallel architecture in which the plurality of T&I pipeline units 630 are executed independently and provide an advantage that the pipelines are utilized more efficiently compared with the Single Instruction Multiple Data (SIMD) architecture.

Since it is preferable that the rays (eye ray and shading ray) generated from the same pixel should be processed in the same T&I pipeline unit 630, each of the plurality of T&I pipeline units 630 may include its own input buffer 610a and output buffer 610b. Also, since the MIMD architecture requires an efficient cache memory, each of the plurality of T&I pipeline units 630 may include its own L1 cache 650. The traversal/intersection test performing unit 530 may perform the traversal/intersection test for ray tracing efficiently and support graphics processing of the ray tracing device 400 effectively.

FIG. 7 is a flow diagram illustrating a T&I scheduling process performed in a ray tracing device using MIMD based T&I scheduling according to one embodiment of the present invention.

Referring to FIG. 7, the ray tracing device 400 may receive a ray generated with respect to a specific frame according to a frame progress order, assign a frame identifier for identifying the specific frame and priority to the corresponding ray, and store the ray in the ray buffer S710. The ray tracing device 400 may allocate a ray provided by the ray buffer through the ray scheduling unit 520 to one of a plurality of T&I pipelines, each of which includes an input and output buffers S730.

Also, the ray tracing device 400 may perform a traversal/intersection test on an allocated ray in a parallel fashion by using each of the plurality of T&I pipelines through the traversal/intersection test performing unit 530 and determine a triangle intersecting the allocated ray S750. Through the test result ordering unit 540, the ray tracing device 400 may receive information about the triangle from a plurality of T&I pipelines as a test result, stores the received information in a test buffer, and re-arrange the test result according to the frame progress order S770. Through the hit point calculation unit 550, the ray tracing device 400 may calculate the coordinates of a ray-triangle hit point based on the test result S790.

Although the present invention has been described with reference to preferred embodiments given above, it should be understood by those skilled in the art that various modifications and variations of the present invention may be made without departing from the technical principles and scope specified by the appended claims below.

The disclosed invention may provide the following effects. However, since it is not meant that a specific embodiment has to provide all of the following effects or only the effects, the technical scope of the disclosed invention should not be regarded as being limited by the specific embodiment.

A ray tracing device using MIMD based T&I scheduling according to one embodiment of the present invention may provide efficient T&I scheduling by arranging buffers operating according to the order of priority before and after a plurality of T&I pipelines.

A ray tracing device using MIMD based T&I scheduling according to one embodiment of the present invention may re-arrange results tested by a plurality of T&I pipelines and merge similar test results into one.

What is claimed is:

1. A ray tracing device using Multiple Instruction Multiple Data (MIMD) based Traversal and Intersection (T&I) scheduling, the device comprising:
    a ray receiving unit receiving a ray generated with respect to a specific frame according to a frame progress order and storing the received ray in a ray buffer;
    a ray scheduling unit allocating a ray provided by the ray buffer to one of a plurality of T&I pipelines, each of which including an input and output buffers;
    a traversal/intersection test performing unit performing a traversal/intersection test on an allocated ray in a parallel fashion by using each of the plurality of T&I pipelines and determining a triangle intersecting the allocated ray; and
    a test result ordering unit receiving information about the triangle from the plurality of T&I pipelines as a test result, storing the received test result in a test buffer, and re-arranging the received test result according to a frame progress order,
    wherein the ray receiving unit assigns a frame identifier for identifying the specific frame and priority to the generated ray.

2. The device of claim 1, wherein, between the ray buffer and the test buffer, whichever one has a higher value of the priority is output first irrespective of the order of an input sequence while, if the priorities are the same, the buffers are output according to the order of the input sequence.

3. The device of claim 1, wherein each of the plurality of T&I pipelines performs a traversal process for an acceleration structure, a triangle list fetch process, and a ray-triangle intersection test process sequentially based on a ray provided by the input buffer and stores results of performing the processes in the output buffer.

4. The device of claim 1, wherein the ray receiving unit generates the frame identifier based on the number of rays generated with respect to the specific frame.

5. The device of claim 1, wherein the ray scheduling unit allocates rays generated from the same pixel so as to be processed in the same T&I pipeline.

6. The device of claim 1, wherein the ray tracing device further includes a hit point calculation unit calculating coordinates of a ray-triangle hit point based on the test result.

7. A ray tracing device using Multiple Instruction Multiple Data (MIMD) based Traversal and Intersection (T&I) scheduling, the device comprising:
    a ray receiving unit receiving a ray generated with respect to a specific frame according to a frame progress order and storing the received ray in a ray buffer;
    a ray scheduling unit allocating a ray provided by the ray buffer to one of a plurality of T&I pipelines, each of which including an input and output buffers;
    a traversal/intersection test performing unit performing a traversal/intersection test on an allocated ray in a parallel fashion by using each of the plurality of T&I pipelines and determining a triangle intersecting the allocated ray; and a test result ordering unit receiving information about the triangle from the plurality of T&I pipelines as a test result, storing the received test result in a test buffer, and re-arranging the received test result according to a frame progress order, wherein the ray scheduling unit includes a ray counter counting the number of successes of the allocation;

when all of the input buffers of the plurality of T&I pipelines are full, assigns the highest priority to the corresponding ray and store the ray in the ray buffer, wherein the count of the ray counter is maintained as before.

8. A ray tracing device using Multiple Instruction Multiple Data (MIMD) based Traversal and Intersection (T&I) scheduling, the device comprising:

a ray receiving unit receiving a ray generated with respect to a specific frame according to a frame progress order and storing the received ray in a ray buffer;

a ray scheduling unit allocating a ray provided by the ray buffer to one of a plurality of T&I pipelines, each of which including an input and output buffers;

a traversal/intersection test performing unit performing a traversal/intersection test on an allocated ray in a parallel fashion by using each of the plurality of T&I pipelines and determining a triangle intersecting the allocated ray; and a test result ordering unit receiving information about the triangle from the plurality of T&I pipelines as a test result, storing the received test result in a test buffer, and re-arranging the received test result according to a frame progress order, wherein, among test results arranged consecutively after the re-arrangement, the test result ordering unit merges those test results having the same frame identifiers and triangles into one.

* * * * *